G. D. JACOBY.
TIRE-UPSETTER.
No. 171,225.　　　　　　　　　Patented Dec. 21, 1875.
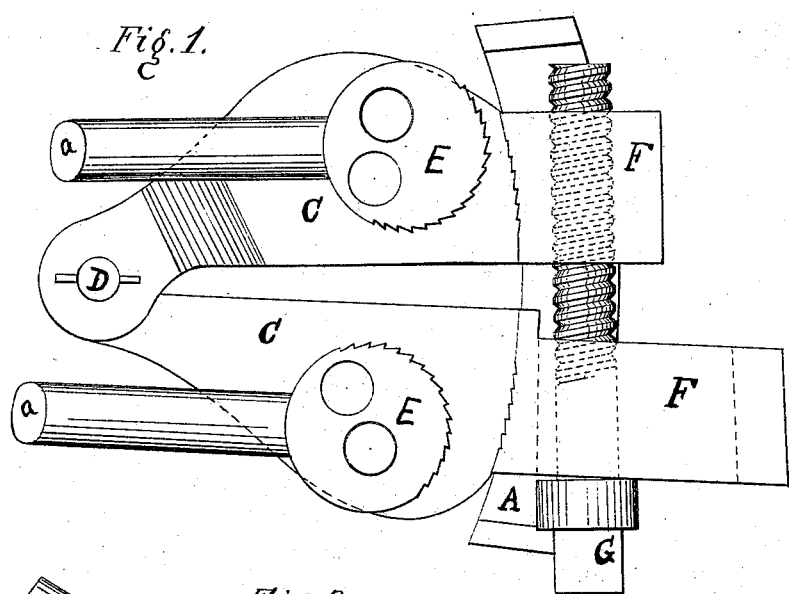
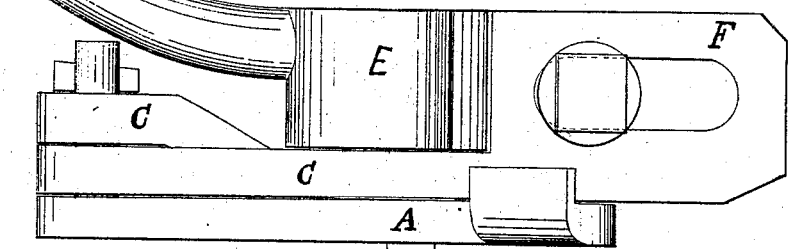
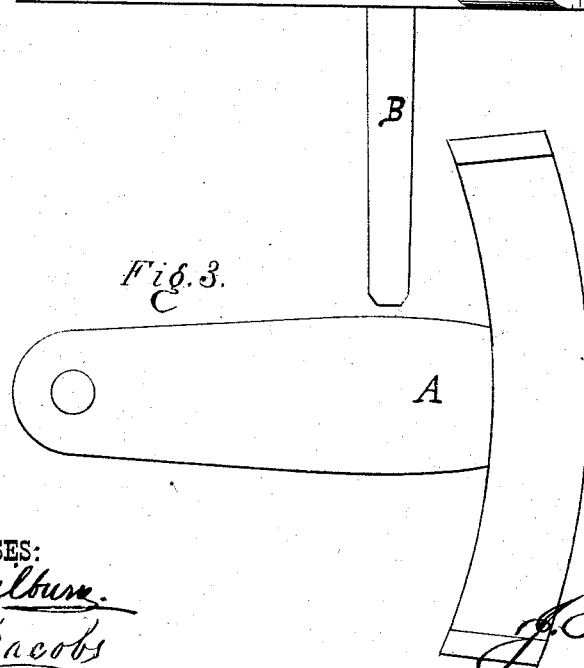
WITNESSES:
George D. Jacoby,
INVENTOR.
ATTORNEY.

UNITED STATES PATENT OFFICE.

GEORGE D. JACOBY, OF BERWICK, PENNSYLVANIA, ASSIGNOR OF ONE-HALF HIS RIGHT TO JOHN G. JACOBY, OF SAME PLACE.

IMPROVEMENT IN TIRE-UPSETTERS.

Specification forming part of Letters Patent No. 171,225, dated December 21, 1875; application filed November 27, 1875.

*To all whom it may concern:*

Be it known that I, GEORGE D. JACOBY, of Berwick, in the county of Columbia and State of Pennsylvania, have invented certain new and useful Improvements in Shrinking Wagon-Tires and Iron Bars of any Shape; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claim.

The object of my invention is to furnish the ordinary blacksmith with a cheap, durable, and convenient shrinking machine or tool, which saves much time and labor in the work of shrinking carriage, wagon, or cart tires, as well as any sort of iron bars which a smith is desirous to shorten or shrink.

I am aware that many machines have been invented for the purpose of shrinking or upsetting tires and shortening bars of iron; but none that is simple, cheap, and that can be used on the anvil, in a space of ten by sixteen inches, and capable of shrinking or upsetting the largest tires or bars, as my machine is.

Figure 1 is a plan view of my invention. Fig. 2 is an end view, and Fig. 3 is a top view, of the standard.

A is the standard—T-shaped—depending from which is the pin B, which secures the machine to a blacksmith's anvil. C C are jaws, pivoted at D. The ends of the standard E E are eccentric, revolving on a steel rod fastened to the jaws C C. About one-half of the circumference of each of these eccentrics is corrugated. The jaws C C are provided with lugs F F, one of which is slotted laterally, and the other provided with a female screw. G is the shaft, which plays in the lateral slot, and the end is provided with a male screw, which engages the female screw of the other lug. The shaft G holds the jaws C C closely together; or they may be separated, as may be desired, by turning the screw-head of the shaft G.

By my invention the work of shrinking tires and bars of iron is accomplished in one-third of the time that it can be done by any other machine, and in one-tenth of the time it can be done by hand—*i. e.*, by cutting out a piece and welding the ends together.

The manner of operating my machine is as follows: The levers A A are moved outward to the right and left, so that the eccentrics E E are separated from the lugs F F. Into the opening thus made is placed the tire or iron bar which it is desired to shrink or shorten. Of course the bar or tire is properly heated before it is placed in this position. Then the levers A A, by a simultaneous movement, are forced inward toward each other. This shrinks the tire or bar.

Having now fully described my invention, what I desire to secure by Letters Patent is—

In a shrinking-machine, the standard A, provided with the jaws C C, pivoted at D, in combination with the corrugated eccentrics E E, the corrugated lugs F F, and the shaft G, provided with a male screw, and operating in the lugs F F, substantially as described, and for the purposes set forth.

In testimony that I claim the foregoing I have hereunto set my hand this 9th day of August, 1875.

GEORGE D. JACOBY.

Witnesses:
 L. T. THOMPSON,
 S. C. JAYNE.